United States Patent [19]

Romagnoli

[11] 4,437,294
[45] Mar. 20, 1984

[54] VOLUMETRIC BATCHING DEVICE FOR PROVIDING PREDETERMINED BATCHES OF A FLUENT MATERIAL

[75] Inventor: Andrea Romagnoli, San Lazzaro di Savena, Italy

[73] Assignee: I.M.A.-Industria Macchine Automatiche-S.p.A., Ozzano Emilia, Italy

[21] Appl. No.: 252,123

[22] Filed: Apr. 8, 1981

[30] Foreign Application Priority Data

Apr. 17, 1980 [IT] Italy .................................. 3389 A/80

[51] Int. Cl.³ .............................................. B65B 9/02
[52] U.S. Cl. ...................................... 53/553; 53/122; 53/555; 222/332
[58] Field of Search .................................. 53/528–530, 53/546–548, 555, 559, 560, 122, 545, 553; 222/309, 332, 384

[56] References Cited

U.S. PATENT DOCUMENTS

| | | | |
|---|---|---|---|
| 1,545,513 | 7/1925 | Peters | 53/122 X |
| 3,813,848 | 6/1974 | Romagnoli | 53/546 |
| 4,052,836 | 10/1977 | Shaw | 53/122 X |
| 4,330,252 | 5/1982 | Bullock | 53/529 X |

FOREIGN PATENT DOCUMENTS 778814  7/1957  United Kingdom ................ 222/332

*Primary Examiner*—A. J. Heinz
*Attorney, Agent, or Firm*—Michael J. Striker

[57] ABSTRACT

Volume batcher for fluent materials, particularly suitable for high speed packaging machines of filter-bags for infusion products such as tea, camomile and similar which comprises a cylindrical drum provided with radial pockets rotating about an horizontal axis below a feed hopper of the product to make up. A filter paper strip is made adherent advance with the cylindrical surface of the drum closing said pockets from the top dead center to the bottom dead center from where it horizontally continues with the quantities of product on it to a packaging station. Said pockets have a volume variable structure by means of a cylinder shaped inside hollow piston member in communication with atmosphere and with at least the radially most outer head perforated.

2 Claims, 3 Drawing Figures

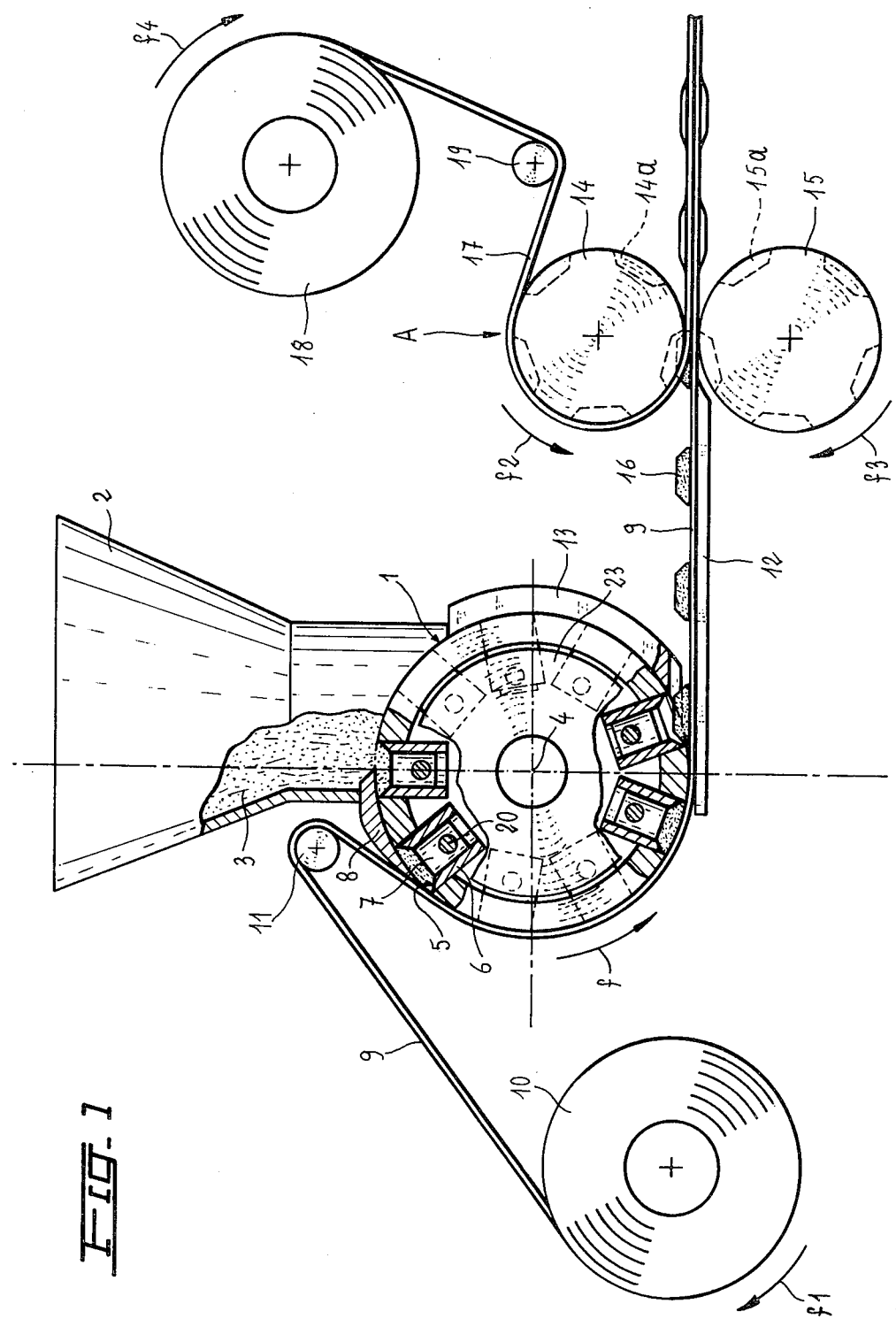

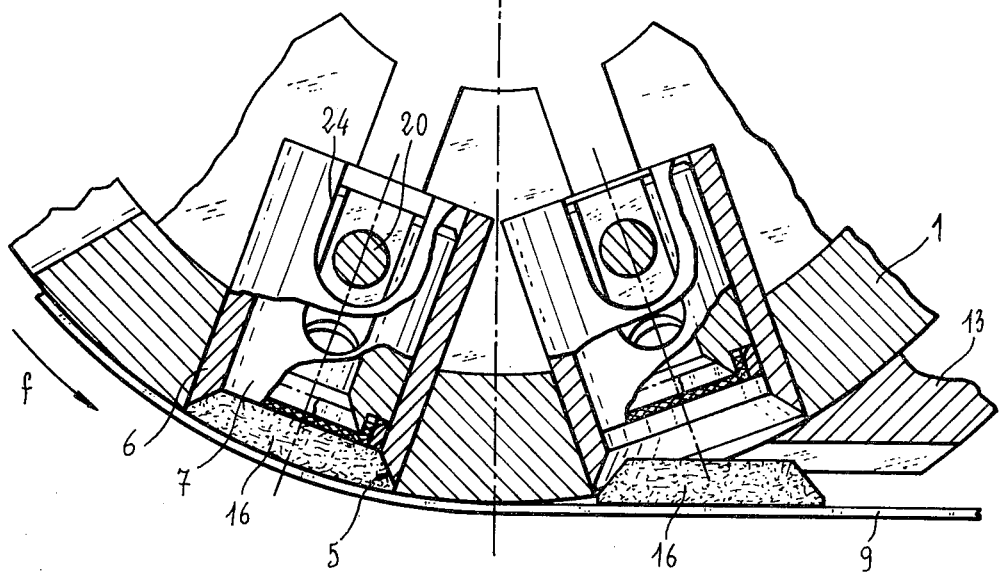
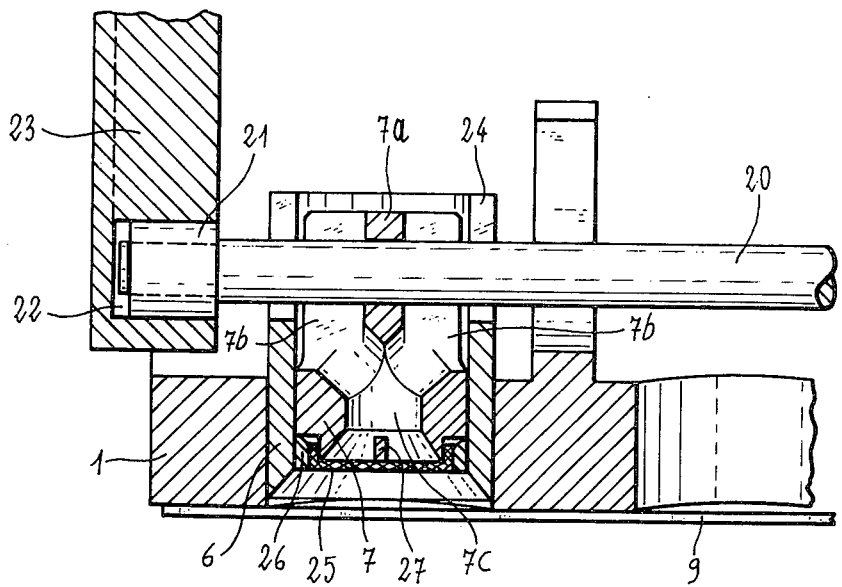

4,437,294

VOLUMETRIC BATCHING DEVICE FOR PROVIDING PREDETERMINED BATCHES OF A FLUENT MATERIAL

BACKGROUND OF THE INVENTION

The present invention relates to volume batchers for fluent materials, particularly suitable for high speed packaging machines of filter bags for infusion products such as tea, camomile and similar.

DESCRIPTION OF THE PRIOR ART

More precisely, the present invention relates to volume batchers for the above mentioned use of the type essentially constituted by a cylindrical dispensing drum with horizontal rotation axis with pockets or volume dispensing chambers radially opened outward that is arranged below a feed hopper of the product to dispense and in which a filter-paper strip is made advance at first adherent with the outer surface or skirt of the rotating dispensing drum to close the same pockets in the direction of the rotation of the same rotating dispensing drum and then in the bottom dead centre of the same rotating dispensing drum it is horizontally made advance with the quantities of product to make up in succession discharged on it by said pockets or radial volume dispensing chambers, to a packaging station of the wished type of filter-bag for every quantity.

For the purpose of attaining to an effective practical functionality of the volume batchers of this type, according to the U.S. Pat. No. 3,813,848 dated June 4th, 1974 of the same Applicant Company, the dispensing drum is arranged below the feed hopper in such a way that this last results in asymmetrical arrangement with reference to the same dispensing drum.

By virtue of such an asymmetrical arrangement of the feed hopper with reference to the below dispensing drum it have been possible to smooth and immediately control by means of the filter-paper strip the product charged by the feed hopper in the pockets or radial volume dispensing chambers of the dispensing drum from the most favourable point for the here relevant forces corresponding to the top dead centre of said dispensing drum in such a way avoiding the spreading of particles of product in the zones around the same pockets so as to allow an easy and safe sealing operation of the filter-paper strip materials around the singles quantities of product to make up for every filter-bag so obtainable. In fact, as the filter paper strip assumes the same peripheral speed of the dispensing drum in the most favourable point for the above mentioned here relevant forces, i.e. in the point where to the maximum peripheral speed of the same dispensing drum oppose itself the greatest gravitational force of the product in the pocket that is in correspondence of such a point, no component force never intervene to modify the state of the rest of the so imprisoned product in the sucession of the pockets by the same filter-paper strip.

In practice, either for the kinematic structuration of the packaging machines or for the structuration of some parts of the volume batcher of which are furnished such packaging machines it's possible to work at a productive unitary speed of 750 filter-bags per minute for every peripheral crown of pockets or at a multiple speed of it corresponding to a greater number of peripheral crowns of the same number of pockets for every crown.

Consequently to the attained possibility by the kinematic structuration of these packaging machines of working at a greater unitary productiveness, in practice it has been noticed that with the structuration of the volume batcher according to the above mentioned United States Patent it is not possible to exploit fully such an attained possibility of greater unitary productiveness of said packaging machine. In fact it has been verified that even continuing to be good the prerogative of the perfect control of the product's quantities in the pockets of the rotating drum shaped dispensing batcher from the drawing top dead centre of the feed hopper to the discharging bottom dead centre of said product's quantities on the horizontal stretch of filter-paper strip in movement towards the packaging station of the wished type of filter-bag, i.e. without spreading of product's particles around the single pockets so to allow an easy and safe sealing operation of the filter-paper strip materials around the single quantities of product to make up, over the above mentioned unitary productive speed such an inconvenient happens on the contrary immediately downstream the aforesaid discharging bottom dead centre of the product's quantities on the filter paper strip in horizontal movement.

After profound studies and careful examinations of all the structural whole in question it have been possible notice that such an inconvenience is caused by the present particular structuration of the functional members that determine the shape of the pockets of the dispensing drum immediately downstream of its discharge bottom dead centre of the product's quantities on the stretch of filter-paper strip in horizontal movement toward the packaging station of the filter-bags. With such pocket's shape in fact, that as it's known is determined by respective radially moving piston shaped members in a corresponding cylinder from a maximum distance with reference to the periphery of the dispensing drum at the moment of the input from below in the drawing zone of the product from the feed hopper at a minimum distance from the same periphery of the disengaging drum in correspondence of the aforesaid top dead centre for the smoothing and consequently for the definition of the product's quantities to make up and contemporaneously for the control of such quantities by the filter-paper strip from such a top dead centre keeping itself in such a position as far as the discharging bottom dead centre of said quantities on the horizontal stretch of the filter paper strip for gradually go back then again in the aforesaid maximum distance for a new drawing of product, in consequence of the discharging of the respective quantities and because of the re-enter movement of the piston shaped member in the corresponding cylinder to reach again said maximum distance for the following drawing of product from the feed hopper a strong windage is produced inside the emptied pocket following the discharging of the respective quantity of product that licks the quantities previously discharged on said stretch of filter-paper strip giving rise to the above lamented inconvenience that precisely consists in the spreading of product's particles around said quantities on the same filter-paper strip in horizontal movement toward the packaging station of the filter-bags by means of the sealing of the filter-paper materials.

OBJECTS OF THE INVENTION

Main object of the present invention is therefore to obviate the above mentioned inconvenience also downstream of the discharging point of the product's quantities by the rotating dispensing drum on the horizontal stretch of filter-paper strip in movement toward the packaging station of the filter-bags by means of the sealing of the filter-paper materials around the same quantities of product.

Another object of the present invention is to furnish a structuration of the members destined to the conformation of the pockets in correspondence of the discharging point of the product's quantities on the horizontal stretch of the filter-paper strip in such a way to prevent the production of the aforesaid violent windage toward the inner side of the pocket just emptied of the product's quantity allowing on the other hand the air to gradually enter from the pocket-bottom as the corresponding product's quantity is progressively discharged from the same pocket.

Another further object of the present invention is to pursue the aforesaid objects by means of a structuration of said members destined to the conformation of the pockets in correspondence of the discharging point of the product's quantities on the horizontal stretch of the filter-paper strip in particularly simple, efficient, of long duration and very cheap way with reference to the practically attained results.

SUMMARY OF THE INVENTION

These and other further objects that will appear following are all attained by means of the volume batcher according to the present invention for fluent materials, particularly suitable for high speed packaging machines of filter-bags for infusion products such as tea, camomile and similar, of the type comprising a cylindrical dispensing drum with horizontal rotating axis with pockets or radial volume dispensing chambers opened on its cylindrical outer surface or skirt, a feed hopper of the product to dispense asymmetrically arranged upon said cylindrical dispensing drum on the opposite side with reference to the rotation direction of the same cylindrical dispensing drum, a smoothing element near the top dead centre of the same cylindrical dispensing drum and direction reversing means of a filter-paper strip made advance at first adherent with the outer surface or skirt in the direction of the rotation of the aforesaid rotating cylindrical dispensing drum starting from said smoothing element as far as its bottom dead centre where it receives the quantities of product to make up from the same dispensing drum on an its stretch made advance to a packaging station of filter-bags by means of the sealing of the filter-paper strip materials around said quantities of product, said pockets or radial volume dispensing chambers being determined by respective radially moving piston members in a corresponding cylinder from a maximum distance with reference to the periphery of the cylindrical dispensing drum at the moment of their input from below in the drawing zone of the product from the feed hopper at a minimum distance from the same periphery in correspondence of the aforesaid top dead centre keeping itself in such an arrangement as far as the aforesaid bottom dead centre and then gradually going back to the aforesaid maximum distance for a new drawing of product from the aforesaid feed hopper, which batcher is characterized in that said piston members have cylindrical inner hollow shape in communication with atmosphere and with at least their radially most outer head determining the respective pocket bottom or volume dispensing chamber being perforated.

The novel features which are considered characteristic for the invention are set forth in particular in the appended claims. The invention itself, both as to its construction and its method of operation, together with additional objects and advantages thereof, will be best understood from the following description of specific embodiments when read in connection with the accompanying drawing.

BRIEF DESCRIPTION OF THE DRAWINGS

Further characteristics and advantages of the volume batcher according to the present invention will be more apparent from the following detailed description of one its preferred embodiment that it's done by way of example and not by limited way with reference to the attached drawings in which:

FIG. 1 schematically shows according to a front fore view a part of packaging machine of filter-bags for infusion products concerned by the volume batcher according to the present invention that is shown with some its parts removed and other dissected for better displeaning someothers, FIG. 2 shows, with increased scale, a part of said volume batcher according to a vertical perpendicular section with reference to its rotation axis in correspondence of a peripheral crown of pockets or volume dispensing chambers, and FIG. 3 shows, still with increased scale, a part of the same volume batcher according to a radial section in correspondence of the axis of one of said pockets.

DESCRIPTION OF THE PREFERRED EMBODIMENT

With reference to said figures, and in particular to FIG. 1 it must be noticed that the volume batcher is constituted by a cylindrical drum designed with 1 and arranged below a feed hopper 2 of the product 3 to make up.

Said volume batcher and said feed hopper of the product to make up are arranged in operative relation between them according to what provided by the aforementioned U.S. Pat. No. 3,813,848 dated June 4th, 1974 of the same Applicant Company, and i.e. with said cylindrical drum volume batcher 1 rotating around its axis 4 in horizontal arrangement below said feed hopper 2 with this latter asymmetrically arranged with reference to the same cylindrical dispensing drum 1 on the opposite side with reference to that in which said cylindrical dispensing drum rotates around its horizontal axis 4 from above to down in the direction of the arrow F (see just said FIG. 1).

Said cylindrical dispensing drum 1 is furnished with at least one crown of pockets or radial volume dispensing chambers 5 circumferentially equally spaced around the peripheral wall of the same cylindrical drum 1. Said pockets or radial volume dispensing chambers 5 are opened on the outer cylindrical surface or skirt of the cylindrical drum 1 and they are defined everyone in the inner side of an axially hollow little cylinder 6 made in the cylindrical drum's body 1 in combination with a piston member 7 slidingly setted up inside said axially hollow little cylinder 6 in the hereafter better explained way.

Still according to what provided by the aforesaid U.S. Patent of the same Applicant Company, near the top dead centre of the cylindrical dispensing drum 1 is provided a smoothing element 8 adherent extending itself or a certain stretch to the outer surface or skirt of said cylindrical dispensing drum 1 on the opposite side with reference to that in which the feed hopper 2 extends itself asymmetrically downward with reference to the same cylindrical dispensing drum.

A filter-paper strip 9 unrolling in the direction of the arrow f1 from a bobbin 10 and reversed by a roller 11 in contact with the outer cylindrical surface or skirt of the cylindrical dispensing drum 1 starting from the end-part of the smoothing element covering the pockets 5 it's dragged in movement at the same peripheral speed of said cylindrical dispensing drum in perfect adherence with its outer surface as far as its bottom dead centre from where it continues to horizontally advance on a supporting face 12 in direction of a filter-bags packaging station A of the packaging machine as better explained hereafter.

An element 13 adherent extend itself with reference to the outer surface of the rotating drum 1 for the protection of the pockets 5 from an immediately downstream point with reference to said bottom dead centre of said rotating drum 1 as far as below the feed hopper 2.

In said packaging station A of the filter-bags packaging machine two rollers 14 and 15 are provided counter-rotating around the respective horizontal rotation axis in the direction respectively of the arrows f2 and f3 and between which the aforesaid filter-paper strip 9 passes in horizontal arrangement with the quantities 16 of product 3 putted on it in succession discharged by the cylindrical drum 1 in the hereinafter better explained way, and a second filter-paper strip 17 unrolled in the direction of the arrow f4 from a bobbin 18 and reversed by a roller 19 around the outer surface or skirt of the roller 14 so to lie over said strip 9 in horizontal arrangement for covering said quantities of product 16.

Said counter-rotating rollers 14 and 15 are furnished on their outer surface or skirt with a plurality of pockets 14a and 15a respectively equally spaced between them with a fixed distance or step separating following adjacent quantities 16 of product 3 lying on the horizontal stretch of filter-paper strip 9.

Such counter-rotating rollers 14 and 15 are of known structure kind for the sealing of the two filter-paper strips 9 and 17 overlapped around the quantities 16 of product 3 to make up in filter-paper bags as hereinafter better explained.

Every piston member 7 sliding inside the corresponding little cylinder 6 is supported by a respective axis 20 parallelly extending with reference to the rotation axis 4 of the cylindrical dispensing drum 1 as far as to extend itself with its opposite ends beyond the opposite sides of said cylindrical dispensing drum 1 (see FIG. 3).

On said opposite ends of said axis 20 an idle roller 21 is assembled guided slidingly engaged in a cam groove 22 obtained on the surface of corresponding specularly opposed disk fixed faces 23 (of which only one may be seen in said FIG. 3) provided on the opposite sides of the cylindrical dispensing drum 1 (see FIGS. 1 and 3).

The little cylinder 6 in which the piston member 7 is assembled slidingly guided presents in its tubular face radially most inner stretch with reference to the cylindrical drum 1 a diametral fissure 24 in which the aforesaid axis 20 is freely movable engaged in radial direction.

On such an axis 20 said piston member 7 is assembled by means of an its diametral rib 7a determined by ducts 7b extending from the radially most inner end and laterally opened to the same piston member 7 and debouching in an opening 7c coaxially presented by the same piston member 7 in its radially most external stretch and expanding through its head so to open itself out.

In correspondence of said radially most external head of the piston member 7 a perforated portion is formed by net 25 which is fixed by means of a pressure ring engaged in the cylindrical end side of the body of the same piston member 7 determining the cup like structure of the same net 25. A little listel 27 fixed in the notches radially made in diametral alignment in the end side of said piston member body 7 provides to maintain and to reinforce in its flat side the portion of net 25 that forms the air passage head of the same piston member 7 (see FIG. 3).

The above described volume batcher operates in the following way:

The cylindrical dispensing drum 1 rotating in the direction of the arrow f make its pockets 5 pass below the feed hopper 2 for the drawing of the product to dispense and following to make up in the following described way.

The piston member 7 of the pocket 5 that is brought by means of the rotation of the cylindrical drum 1 to be gradually inserted below said feed hopper 2, by means of the cam groove 22 in which is slidingly engaged the roller 21 loose supported by its axis 20, in this circumferential position is at a maximum distance from the periphery of said cylindrical drum 1 so to permit the input of the product 3 in the pocket 5.

By means of the continuous rotation of the drum 1, still by means of the cam groove 22 said piston member is gradually moved toward the periphery of the drum 1 as far as to be situated at the minimum distance from said periphery of the same drum 1 in correspondence of the top dead centre so to determine the quantity 16 of product 3 in the pocket 5 because of the smoothing element 8. Continuing the rotation of the drum 1, such a quantity of product 3 is continuously controlled at first below the same smoothing element 8 and then by the filter-paper strip 9 advancing at the same peripheral speed of the cylindrical drum 1 as far as the bottom dead centre of the same drum 1.

In such a way the product 3 constituting the quantity 16 remains completely imprisoned in the pocket 5 so avoiding that the particles of product 3 are inserted between the surfaces in contact of the filter paper strip 9 and of the drum 1.

In correspondence of said bottom dead centre, the quantity 16 of product 3 begins its discharge from the pocket 5 lying down on the horizontal stretch of filter-paper strip 9 in movement toward the packaging station A of the packaging machine. Contemporaneously, still by means of the groove cam 22, the piston member 7 begins to go back for returning in its aforesaid maximum distance from the periphery of the drum 1 below the feed hopper 2, while during the gradual discharge of the quantity 16 of product 3 from its pocket, because of the above described structuration of said piston member 7 air begins to enter inside the same piston member 7 in the pocket 5 gradually empting out of the product 3 so eliminating the possibility of determining the lamented strong windage toward the inside of the same emptied pocket 5 that went to lap the quantities previously discharged on the horizontal stretch of the filter-paper strip 9 and that determined the lamented inconvenient of spreading of product's particles 3 around the same quantities that obstructed the perfect sealing of the filter paper materials around the same quantities.

Said quantities 16 of product 3 discharged on the horizontal stretch of filter-paper strip 9 are carried by the same strip 9 with the filter-paper strip 17 that is arranged upon the same quantities 16 inside the pockets 14a and 15a between the two counter-rotating sealing rollers 14 and 15 that provide so to seal toghether without any inconvenient of anykind said filter-paper strip 9 and 17 all around said quantities 16 of product 3.

The filter paper strips 9 and 17 so joined together and containing the quantities 16 advance in the packaging machine where in known way are separated in stretches everyone comprising one quantity of product 16 for the determination of single filter-bags for the infusion product in them contained.

Obviously the cylindrical dispensing drum 1 can be provided in the usual way with more than one crown of radial pockets 5 parallelly aligned with the rotation axis of the same cylindrical drum 1 as it can be also noticed in the same FIG. 3 of the attached drawings or in an anyhow wished arrangement.

In practice, the particular above described structuration of the piston member of the pockets or radial volume dispensing chambers has permitted to eliminate completely the lamented inconvenient of the spreading of product's particles around the quantities of product 16 downstream of their discharge point on the horizontal stretch of filter-paper strip in the packaging machines working at an unitary productive speed very superior than that reached till now.

In its practical embodiment such a structuration of the piston member can changes within the limits of the level of the following claims holding good the resolutive concept consisting in the attained possibility of making enter air in the dispensing pocket in the back side of the product's quantity as this is discharged from said pocket.

It will be understood that each of the elements described above, or two or more together, may also find a useful application in other types of volumetric batching devices differing from the types described above.

While the invention has been illustrated and described as embodied in a volumetric batching device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A volumetric batching device providing predetermined batches of a fluent material in a packaging machine, comprising: a cylindrical dispensing drum having a periphery and rotating about a horizontal axis, said drum having a plurality of radially outwardly open pockets and a plurality of radially movable pistons, each of said plurality of pistons being associated with and defining a respective one of said pockets; means for supplying the material to be dispensed into the pockets, said supplying means being arranged near said drum; a smoothing element positioned near a top dead center point of said drum; and means for guiding a filter paper strip around and in a direction of rotation of said drum from said smoothing element to a position at a bottom dead center point of said drum from which the predetermined batch of the material is forwarded to a packaging station; means for moving each piston between a first position of a maximum distance to the periphery of the drum in which first position the piston passes the top dead center point of said drum and is located below the supplying means for receiving the predetermined batch of the product and a second position of a minimum distance to the periphery of the drum in which second position the piston passes the bottom dead center point for discharging the predetermined batch of the material, each of said pistons having an inside hollow cylindrical space and an outer perforated portion facing the periphery of the drum and defining the respective pockets so as to provide ventilation of the pocket into the inner cylindrical space of each piston and thereby preventing adhering of the material to the outer portion of each piston.

2. A volumetric batching device according to claim 1; and further comprising a pressure ring, said perforated portion being constituted by a net connected to the respective piston by means of the pressure ring.

* * * * *